US011243864B2

(12) United States Patent
Cockcroft et al.

(10) Patent No.: US 11,243,864 B2
(45) Date of Patent: Feb. 8, 2022

(54) IDENTIFYING TRANSLATION ERRORS (71) Applicant: International Business Machines Corporation, Armonk, NY (US)

(72) Inventors: Bryant Cockcroft, Austin, TX (US);
John A. Schumann, Austin, TX (US);
Debapriya Chatterjee, Austin, TX (US); Larry Leitner, Austin, TX (US);
Kevin Barnett, Austin, MN (US);
Karen Yokum, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/572,855

(22) Filed: Sep. 17, 2019

(65) Prior Publication Data
US 2021/0081296 A1 Mar. 18, 2021

(51) Int. Cl.
*G06F 9/44* (2018.01)
*G06F 11/34* (2006.01)
*G06F 9/48* (2006.01)
*G06F 12/1036* (2016.01)

(52) U.S. Cl.
CPC ........ *G06F 11/3471* (2013.01); *G06F 9/4812* (2013.01); *G06F 12/1036* (2013.01)

(58) Field of Classification Search
CPC . G06F 9/4812; G06F 11/3471; G06F 12/1036
See application file for complete search history.

(56) References Cited

U.S. PATENT DOCUMENTS

| 5,446,876 | A | 8/1995 | Levine et al. |
| 6,446,224 | B1 | 9/2002 | Chang et al. |
| 8,892,447 | B1 | 11/2014 | Srinivasan et al. |
| 9,009,579 | B2 | 4/2015 | Nakaide et al. |
| 9,223,600 | B1* | 12/2015 | Ross ................... G06F 9/45533 |
| 9,697,120 | B2* | 7/2017 | Macpherson ........... G06F 9/455 |
| 2007/0011656 | A1 | 1/2007 | Kumamoto |
| 2007/0168643 | A1* | 7/2007 | Hummel ............. G06F 12/1009 |
| | | | 711/207 |

(Continued)

FOREIGN PATENT DOCUMENTS

| CN | 101030173 A | 9/2007 |
| CN | 102326155 A | 1/2012 |
| CN | 105980994 A | 9/2016 |

OTHER PUBLICATIONS

Anonymous, "Method and Apparatus for Handling Self Modifying Code in Dynamic Binary Translated Simulators," ip.com, An IP.com Prior Art Database Technical Disclosure, IP.com No. IPCOM000245170D, IP.com Electronic Publication Date: Feb. 16, 2016, 7 pages.

(Continued)

*Primary Examiner* — Wei Y Zhen
*Assistant Examiner* — Amir Soltanzadeh
(74) *Attorney, Agent, or Firm* — Alex Harvey (57) ABSTRACT

An instruction may be associated with a memory address. During execution of the instruction, the memory address may be translated to a next level memory address. The instruction may also be marked for address tracing. If the instruction is marked for address tracing, then during execution of the instruction, the memory address and the next level memory address may be recorded.

18 Claims, 5 Drawing Sheets

(56) References Cited

U.S. PATENT DOCUMENTS

| | | | |
|---|---|---|---|
| 2011/0082962 A1* | 4/2011 | Horovitz | G06F 11/301 711/6 |
| 2014/0089528 A1* | 3/2014 | Bloch | G06F 12/08 710/4 |
| 2016/0259731 A1 | 9/2016 | Evans et al. | |
| 2017/0371789 A1 | 12/2017 | Blaner et al. | |
| 2018/0373647 A1* | 12/2018 | Dewan | G06F 12/109 |

OTHER PUBLICATIONS

IBM, "Method for collecting minimal, but complete Real Address translation information in a hardware core performance trace," ip.com, An IP.com Prior Art Database Technical Disclosure, Original Publication Date: Apr. 26, 2005, IP.com No. IPCOM000124543D, IP.com Electronic Publication Date: Apr. 26, 2005, 3 pages.

Anonymous, "Precise Merging Translation Queue in a Slice-Based Processor," ip.com, An IP.com Prior Art Database Technical Disclosure, IP.com No. IPCOM000249317D, IP.com Electronic Publication Date: Feb. 16, 2017, 3 pages.

Farrus et al., "Linguistic-based evaluation criteria to identify statistical machine translation errors," Research Gate, Jan. 2012, 8 pages.

Alam et al., "Do-It-Yourself Virtual Memory Translation," ISCA '17, Jun. 24-28, 2017, Toronto, ON, Canada, © 2017 Association for Computing Machinery, 2017, 12 pages.

Daems et al., "Identifying the Machine Translation Error Types with the Greatest Impact on Post-editing Effort," Frontiers in Psychology, vol. 8, Article 1282, Aug. 2017, 15 pages.

\* cited by examiner

IDENTIFYING TRANSLATION ERRORS

BACKGROUND

The present disclosure relates to computer virtualization, and more specifically, to tracking and recording memory address translations.

Virtualization in the context of computer systems refers to the concept of simulated hardware. Use cases range from basic virtual memory schemes found in nearly all modern consumer computing devices to multiple full virtual machine implementations running simultaneously on a server in a server farm. Virtualization may provide significant advantages in modern computer systems. For example, different virtualization implementations can allow for improved security (by allowing multiple programs to execute simultaneously without corrupting each other's data, for example), improved flexibility (by allowing multiple ordinarily-incompatible operating systems to execute on a single machine, for example), and improved efficiency (by allowing computers to eliminate wasteful gaps when allocating Random Access Memory (RAM), for example).

As memory organizes stored data using an address system, programs may make requests corresponding to particular addresses. In a typical virtual memory system, programs may not be permitted to "know" the actual memory addresses of the machine. Instead, programs may use a set of virtual addresses when sending instructions or requests. When the central processing unit (CPU) receives these requests, it may translate from the program-specific virtual address to the physical "machine" address of the memory. CPUs may translate the address through the use of page tables, which are essentially condensed ledgers that map virtual addresses to physical (or other) addresses. The CPU may also maintain these page tables.

SUMMARY

Some embodiments of the present disclosure can be illustrated as a method. The method may comprise translating a memory address from a first level address to a second level address. The memory address may be associated with an instruction. The method may further comprise determining whether the instruction is marked for address tracing. If the instruction is marked for address tracing, the method may further comprise recording the first level address and the second level address Some embodiments of the present disclosure can be illustrated as a system. The system may comprise memory and a processor. The processor may translate a memory address from a first level address to a second level address. The memory address may be associated with an instruction to be executed by the processor. The processor may also determine whether the instruction is marked for address tracing. If the instruction is marked for address tracing, the processor may further record the first level address and the second level address.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

While the disclosure is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

While virtualization systems may provide significant benefits when working properly, incorrect memory address translations can result in aberrant system behavior, errors, and/or crashes. These memory translation errors are particularly problematic because they are notoriously difficult to detect, identify, and debug. As an example, a program may request data at a particular virtual address, after which the central processing unit (CPU) may translate the received virtual address to a corresponding machine memory address of physical memory and fetch data from that machine address to return to the program. Memory translation errors occur when the memory address was translated incorrectly. If this happens, the machine address in the memory that the CPU accesses will not actually be the correct address (i.e., may not correspond to the virtual address described by the program). Ordinarily, the CPU may not have any way to realize that it has been returned the incorrect address and may therefore attempt to proceed as normal (i.e., accessing the incorrect address and returning the data stored therein). Thus, the CPU may return incorrect data to the program. When a memory translation error occurs, software may receive incorrect data, attempt to modify data assigned to a different program, or often simply crash. In addition, in some cases, the program may be able to proceed as if it had received the correct data, in which cases no error would be detected. This may be even worse than a crash, as the program is likely to malfunction, but the exact cause may be difficult to determine. These errors may occur, for example, when a page table is corrupted, as a result of improperly written software or firmware, etc.

Memory translation errors may be associated with particular instructions. For example, a particular instruction may require that certain data be accessed from memory at a particular address. If that address is mistranslated, the translation error would be referred to herein as associated with that particular instruction. Thus, identifying which instructions are causing or resulting in translation errors may be particularly advantageous. In embodiments of the present disclosure, one or more instructions to be executed by a processor may be "tagged" for tracing. As a tagged instruction is executed, a debug system may "trace" memory address translations by recording them. The recorded translations may later be compared to expected results. Instructions may be tagged in a variety of ways, such as through the use of indicator bits, as will be described in further detail below.

Aspects of the present disclosure relate to a method for detecting memory translation errors. More particular aspects relate to a method that includes recording memory translations performed during execution of an instruction, comparing the translations to expected values, and determining whether any translation errors have occurred. While the present disclosure is not necessarily limited to such applications, various aspects of the disclosure may be appreciated through a discussion of various examples using this context. As an example, a method consistent with the present disclosure may include translating a memory address from a first level address to a second level address. The memory address may be associated with an instruction to be executed by a processor. The method may further include determining whether the instruction is marked for address tracing, and, responsive to a determination that the instruction is marked for address tracing, recording the first level address and the second level address.

Throughout this disclosure, reference is made to a variety of different memory addresses, including physical addresses, virtual addresses, machine addresses, interim addresses, etc. As used herein, "machine address" generally refers to the actual memory address in Random Access Memory (RAM) where data is stored. "Virtual address" refers to a virtualized memory address such as that used by an application and mapped via one or more page tables.

In some embodiments, a virtual address may be mapped directly to a corresponding machine address. In some embodiments, the virtual address may be mapped to an intermediate address. This intermediate address may be mapped to the machine address, however in some embodiments additional intermediate addresses may be implemented depending upon configuration or embodiment. For example, a virtual address may be mapped to a first intermediate address. The first intermediate address may be mapped to a second intermediate address, where the second intermediate address is mapped to the machine address. Each of these mappings may be recorded in one or more page tables. Thus, an instruction calling for data stored at a virtual address may require performing several memory address translations before the machine address actually containing the data is obtained. Each of these translations may be a possible source of a translation error. As additional intermediate addresses are implemented, determining which of these translations is causing a translation error ordinarily may become increasingly time consuming and difficult. For example, in some embodiments upwards of thirty translations may need to be performed. Aspects of the present disclosure may enable users to identify translation errors by tracing translations performed on a per-instruction basis.

Throughout this disclosure, reference is made to various "levels" and/or "layers." As used herein, these terms generally refer to a level or layer of a computing system. Examples include a kernel layer, an operating system layer, a hypervisor layer, an application layer, etc. As some embodiments may include ten layers or more and executing an instruction may include performing at least one translation for every layer. Thus, in the interests of brevity and clarity, discussion of these embodiments often refers to translating to a "next level address" rather than tracking a naming convention for every layer. A "next level address" may refer to a second address to which a first address corresponds and to which the first address may be translated. The term "next level address," as used herein, is relative to the address being translated. For example, in a simple single-layer virtualization example wherein an application utilizes virtual memory addresses that are mapped to machine addresses (e.g., via a page table), a virtual memory address's "next level address" would simply be the machine address, so "translating the virtual memory address to the next level address" refers to translating the virtual address to the machine address. In some examples, however, a virtual memory address being translated to a "next level address" may refer to translating the virtual address to an intermediate address (such as a "guest physical address," which is what an operating system "thinks" is the machine address). That intermediate address may then be translated to its next level address (e.g., the machine address, a further intermediate address, etc.). For purposes of this disclosure, "virtual address" is used to refer to the highest-level address in embodiments with at least one level of virtualization.

Figure 1:
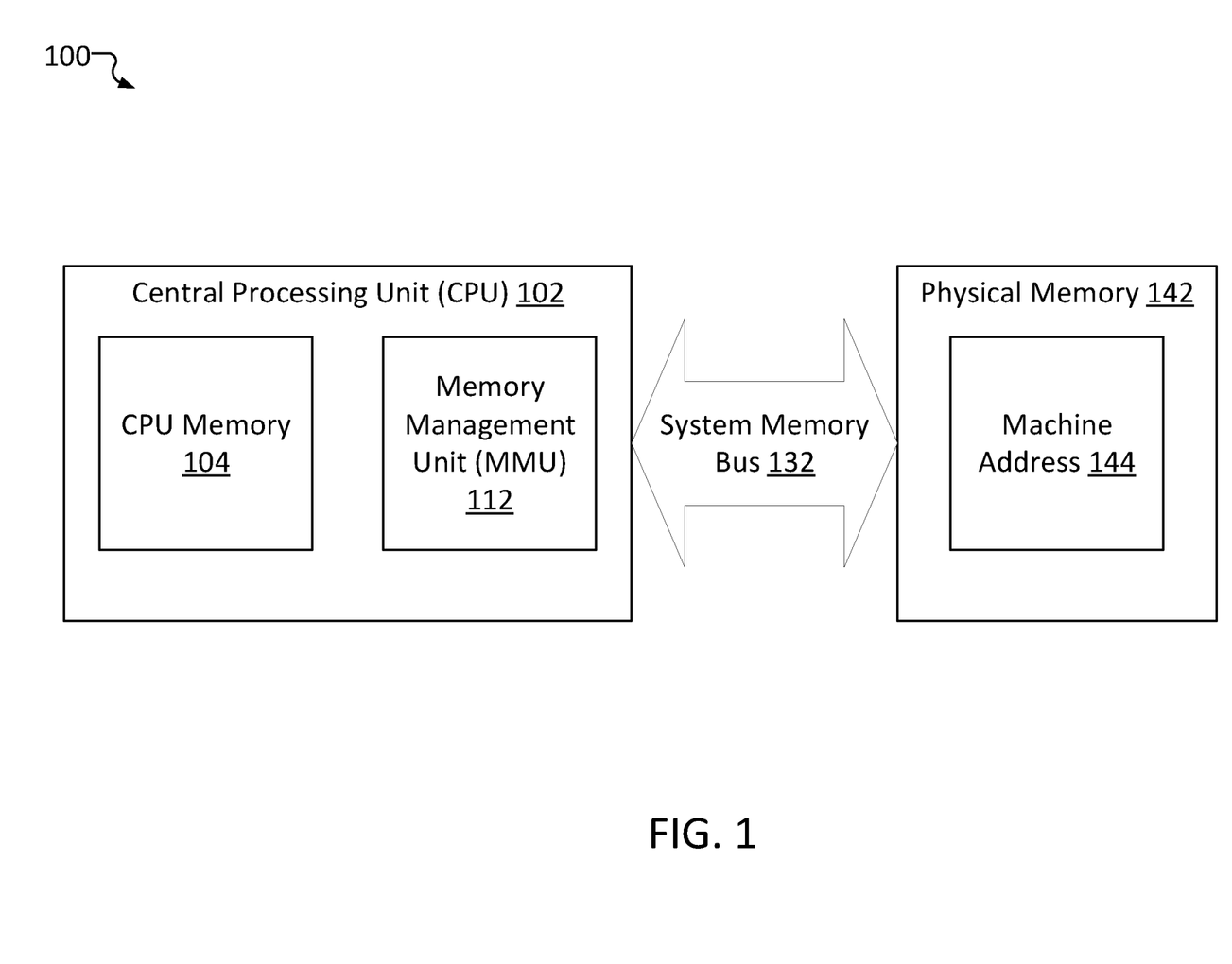
FIG. 1 illustrates a block diagram of a memory translation debug system to identify memory translation errors according to several embodiments of the present disclosure.

FIG. 1 illustrates a block diagram of a memory translation debug system 100 to identify memory translation errors according to several embodiments of the present disclosure. System 100 includes a central processing unit (CPU) 102 and physical memory 142, connected by system memory bus 132. CPU 102 includes CPU memory 104 and a memory management unit (MMU) 112. Additional typical components of CPU 102, such as a processing unit, power infrastructure, etc., are not depicted in FIG. 1. Physical memory 142 includes a plurality of memory addresses such as machine address 144 configured to store data.

In operation, an application running on memory 142 may have data stored at machine address 144. In a typical virtual memory example, the application may not be permitted to determine the location of address 144; instead, the application may utilize and refer to its own virtual memory. Thus, if the application attempts to access the data (i.e., via an instruction associated with the virtual address), then as CPU 102 executes the instruction, MMU 112 may use tables created or installed by an operating system (OS) to translate the virtual address to the machine address 144 and retrieve the data.

In embodiments consistent with the present disclosure, the instruction including the associated virtual address may be "tagged" or "traced." This may be implemented in a variety of different ways. For example, the instruction may have one or more previously reserved bits utilized to indicate to CPU 102 that the instruction is tagged. In other embodiments, this tracing or tagging may be additional functionality added onto existing instructions, such as a trace interrupt. In embodiments, once CPU 102 determines that the instruction is marked for tracing, memory translations are recorded in CPU memory 104.

CPU memory 104 may include one or more arrays configured to store recorded memory addresses such as machine address 144. As a traced instruction is executed by CPU 102, CPU 102 may record memory addresses and their associated translated addresses in CPU memory 104. For example, if an application requests access to data in a virtual memory address corresponding to address 144 via a traced instruction, then CPU 102 may retrieve and return the data as normal, but also record the virtual address submitted by the application as well as the machine address 144 it corresponded to in an array in CPU memory 104. In some embodiments, CPU memory 104 may also be configured to identify the instruction that the stored addresses correspond to. In some embodiments, once the traced instruction is complete and the memory translations recorded, contents of the array may then be copied, saved, written, or otherwise stored into physical memory 142 or elsewhere (such as to long-term storage, not shown in FIG. 1).

The array(s) of CPU memory 104 may comprise a number of rows or columns based on a maximum possible number of translations or memory accesses necessary to perform an operation in system 100. For example, in a system including a single virtualization layer (virtual address to machine address), the arrays may comprise two columns; one for the machine address and one for the virtual address. In an example system including multiple virtualization layers and/or hypervisors wherein up to thirty translations may occur for a given instruction, the array may comprise thirty-one columns. This may conserve valuable space on CPU memory 104, improving performance of system 100.

Upon receiving a virtual address associated with the instruction, MMU 112 may determine which machine address 144 of physical memory 142 includes the requested data. This may include determining whether the corresponding next level address is stored in a translation lookaside buffer (TLB), resulting in a "TLB hit" (whereas a "TLB miss" would result from a determination that the address is not stored in the TLB). In the case of a TLB miss, MMU 112 will utilize one or more stored page tables to retrieve the corresponding next level address. The page table(s) may be distributed, for example, among memory 142, in long-term storage (such as a hard disk drive, solid state drive, etc.), or elsewhere. If the instruction being executed is tagged for tracing, MMU 112 may also cause the next level address to be written to an array in CPU memory 104. MMU 112 may further cause CPU 102 to write some or all contents of the array of CPU memory 104 to physical memory 142. If the next level address is not the machine address 144 (i.e., if the virtual address is mapped to an intermediate address), this process may be repeated to translate the intermediate address to its next level address, including writing to the array in CPU memory 104 and/or physical memory 142. This process may continue until machine address 144 is identified.

With machine address 144, a component of CPU 102 such as a load-store unit (LSU) or MMU 112 may also determine if the data at the machine address 144 is already stored in a processor cache (a "cache hit," where a determination that the data is not in the cache is a "cache miss"). In the case of a cache miss, MMU 112 may return machine address 144 to CPU 102 so CPU 102 may attempt to retrieve the data from machine address 144. If machine address 144 is incorrect due to a translation error, the attempt to retrieve the data is likely to fail or otherwise result in error.

However, memory translation flaws may not consistently result in error. For example, an OS may be improperly written such that a particular translation would result in an incorrect next level address. However, if the correct address is already stored in the TLB, MMU 112 may not need to perform a translation, so the error may not actually occur. This may make reliably detecting the root problem (in this example, the improperly written OS) more difficult. For this or other reasons, it may be beneficial to disable TLB lookup and/or cache lookup operations such as those described above for instructions marked for tracing. In some embodiments, TLB and/or cache lookup may be disabled for all operations. This may force system 100 to perform memory translations, enabling system 100 to better determine when translation errors are occurring. This may, in turn, enable a user of system 100 to identify and/or correct a cause of memory translation errors. For example, if the cause is a software error, a user (e.g., a developer of the software) could review and modify the relevant software to prevent the translation error from occurring further.

Figure 2:
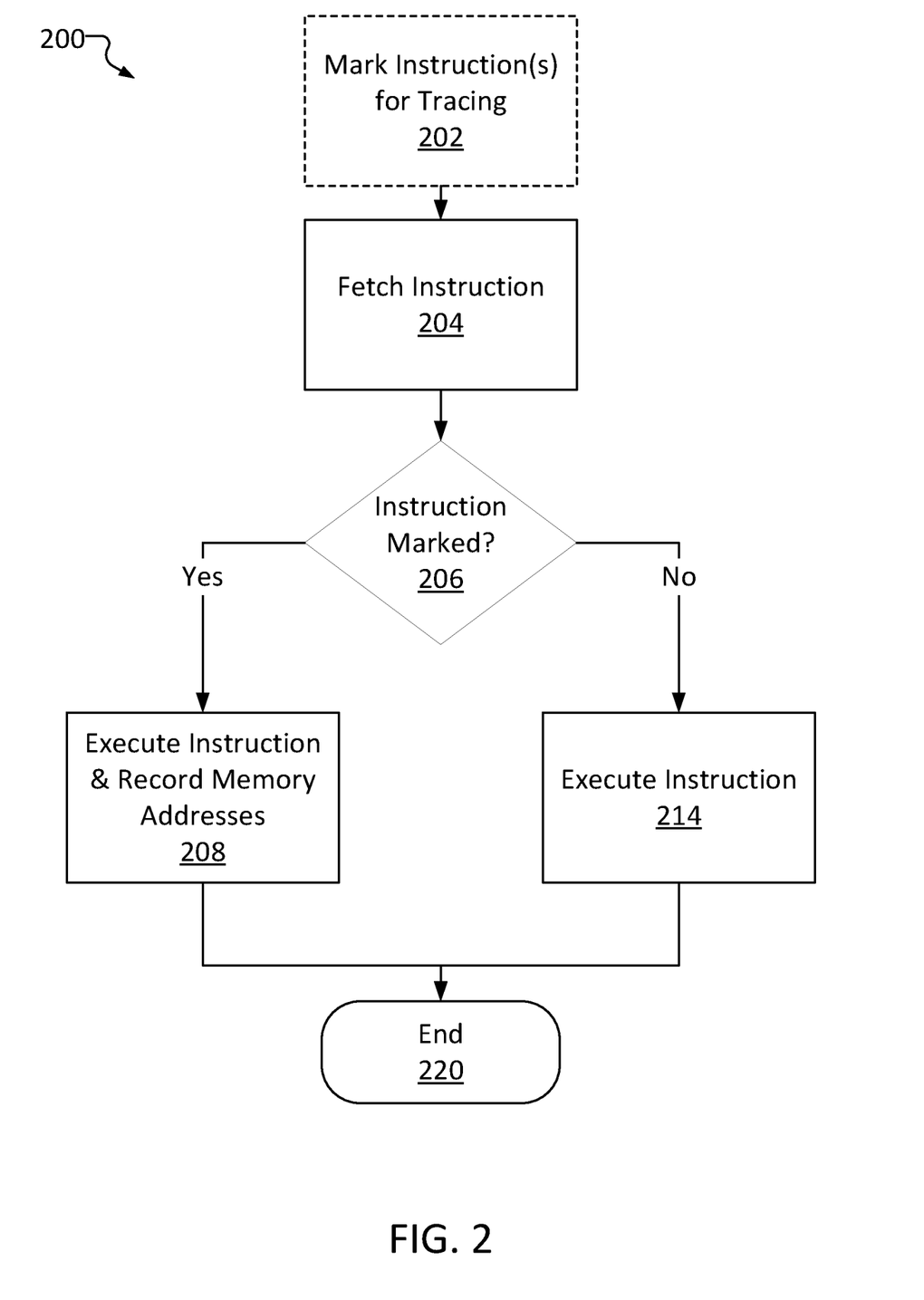
FIG. 2 illustrates a memory address translation tracing method according to an embodiment of the present disclosure.

FIG. 2 illustrates a memory address translation tracing method 200 according to an embodiment of the present disclosure. Method 200 may optionally include marking one or more instructions for tracing 202. This may be performed by a user of a tracing system, such as system 100. However, in some embodiments, instructions may already be marked (i.e., from an external source); method 200 does not necessarily require the instructions to be marked by the same system that is performing method 200. Method 200 includes fetching an instruction 204. This may be performed by a CPU (such as, for example, CPU 102) in accordance with an operating system (OS) scheduler, in which case the instruction may correspond to an application. The instruction may be stored in memory, such as memory 142. Method 200 further includes determining whether the instruction is marked for tracing 206. In some embodiments, an instruction may have an indicator bit to describe whether the instruction should be traced. When the instruction is fetched, the CPU may determine whether the instruction is marked for tracing by determining the value of the trace indicator bit. In some embodiments, the instruction may utilize multiple indicator bits, as will be described in further detail below.

If the instruction is marked for tracing (i.e., 206 "Yes"), method 200 further includes executing the instruction and recording memory translations 208. This may be performed by, for example, a CPU or a component thereof (such as a memory management unit, load-store unit, translation engine, etc.) For example, if the instruction calls to access data stored in a virtual memory address, 208 may include recording the virtual address, translating the virtual address into a next level address, and recording the next level address. If there are additional levels (such as an OS level, hypervisor level, etc.) of translation necessary, 208 may further include recording each address as it is translated. The addresses may be initially recorded in memory such as in CPU memory 104 and later written to memory such as physical memory 142 and/or longer-term storage, such as a hard disk drive, etc. The addresses may be recorded in specific reserved portions of CPU memory 104. As CPU memory 104 is generally limited in storage capacity, it may be beneficial to allocate as little space as possible. In some embodiments, CPU memory 104 may only set aside space for a single address, and thus each address may be written to physical memory 142 as it is translated. However, this may result in significant performance penalties, as memory accesses are generally slower than CPU memory writes by several orders of magnitude. It may therefore be desirable for CPU memory 104 to include enough reserved space to store an array of the maximum possible number of translations. This maximum may depend upon system configuration (architecture, number of levels, etc.). This way, the CPU may simply write each address to an index in the array as it is translated, and, upon completion of the instruction, write the entire array of addresses to memory (or longer-term storage) to improve performance. Method 200 may then end 220.

If the instruction is not marked for tracing (i.e., 206 "No"), method 200 further includes executing the instruction 210. This may include simply executing the instruction as normal. In some embodiments, 210 may include executing the instruction and specifically recording that it was not marked for tracing. For example, this could be indicated via entries in CPU memory 104 and later written to memory 142. This may help a user in utilizing system 100, as it could serve as a reminder of which instructions are being executed without being traced. It may also allow a user to detect whether an instruction that should have been traced was determined to not be marked for tracing (for example, if a user forgot to mark a specific instruction). Method 200 may then end 220.

In some embodiments, a user or the system may mark every instruction of an application for tracing. For example, in some embodiments, a debug program such as memory translation debug system 100 may enable a user to "select all" instructions for translation tracing. In some embodiments, CPU 102 may be configured to record memory address translations for every instruction executed (i.e., not just for a specific application). For example, an instruction may cause CPU 102 to record address translations until a later instruction causes CPU 102 to cease recording. In some embodiments, CPU 102 may skip the step of determining whether an instruction is marked for tracing 206 if it is configured to trace all instructions. However, in some embodiments, tracing every instruction may be implemented by using the same (or similar) indicator bit(s) by setting the bit(s) to cause the CPU to record memory addresses. In these embodiments, the CPU may still make the same determination 206.

These "trace all" embodiments may advantageously save time by enabling a user to forgo determining which instruction(s) to track. Tracing every instruction of an application may also result in detecting errors corresponding to instructions that a user may not have ordinarily deemed necessary to track. On the other hand, depending upon the number of instructions in an application, tracing every instruction in the application may significantly extend running time and/or may result in significant storage overhead, and thus may not always be the preferred approach when compared to, for example, "manually" selecting instructions to trace.

Figure 3:
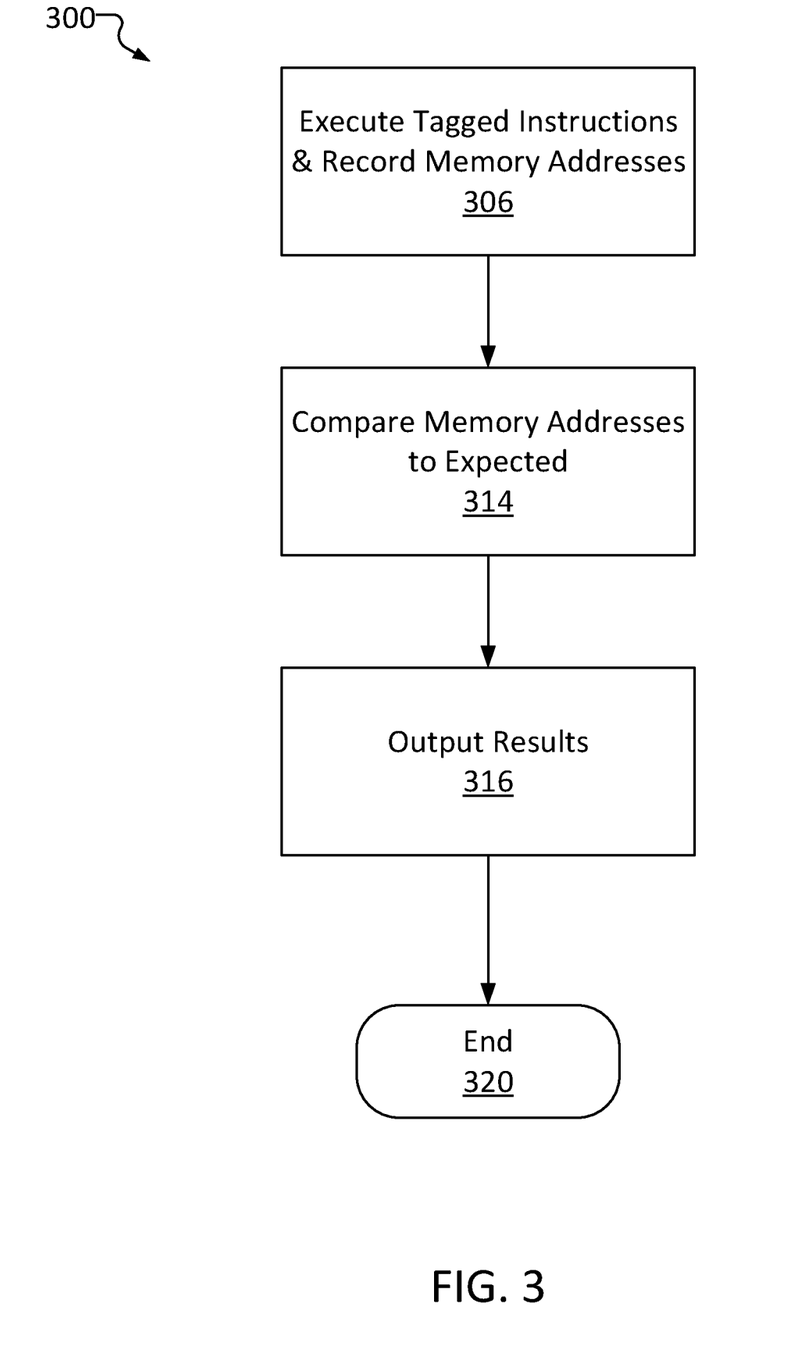
FIG. 3 illustrates a memory address translation verification method according to an embodiment of the present disclosure.

FIG. 3 illustrates a memory address translation verification method 300 according to an embodiment of the present disclosure. Method 300 includes executing instructions and recording memory addresses 306. This may include, for example, method 200 of FIG. 2. In some embodiments, 306 includes recording all memory address translations, while in some embodiments, 306 may include recording translations corresponding to specifically marked instructions. Next, the recorded memory addresses are compared to expected values in block 314. This may include, for example, verifying the various memory translations that were performed and recorded during execution (i.e., at block 306). This verification may include determining if any of the recorded addresses differ from their expected values.

In order to determine expected address translation values, an application running on address translation debug system 100 may have or obtain permission to access the one or more page tables used in mapping memory addresses. These page tables may be stored in physical memory/RAM, or in longer-term storage such as on a hard disk drive, solid state drive, flash memory, etc. In some instances, verifying memory translations may result in security vulnerabilities, as it circumvents one of the main purposes of virtualization—controlling which applications, etc. have access to low-level address information. While enabling a typical application to access these page tables may ordinarily comprise a security vulnerability, this is generally not an issue in a "development" or "debugging" environment. Thus, in some embodiments, operations such as method 300 may be performed in a development or debugging environment, such as when developing, writing, and/or editing software. In this environment, a CPU such as CPU 102 may be specially configured (e.g., via modification of CPU microcode, implementation of a privileged special purpose register (SPR) with a bit controlling an "insecure debug mode," etc.) to disable or circumvent memory access restrictions commonly utilized in virtualization. Thus, while instructions may initially be executed normally (except with memory addresses recorded), after execution is complete, CPU 102 may determine expected memory addresses based on the page tables and initial virtual addresses. The recorded addresses can then be compared to expected values. These expected addresses may be determined by CPU 102 and then stored in physical memory 142 in the form of, for example, an array, allowing system 100 to compare the expected addresses to recorded addresses and determine if any do not match. In some embodiments, system 100 may further store instruction identification information alongside the expected and/or recorded addresses in physical memory 142, further enabling identification of which instruction(s) may have resulted in error.

In some embodiments, rather than directly access the page tables, system 100 may simply verify that the MMU 112 performed its step of the translation as expected. This may not necessarily require the access permissions associated with the page table, but also may not conclusively identify a source of some errors.

Method 300 further includes outputting results 314. This may include, for example, generating an array showing one or more datasets such as instruction identifiers, whether the instructions were traced, the recorded memory addresses, the known memory addresses, and whether the translated values corresponded to known values. In some embodiments, 314 may simply list instructions which included translation errors, or even whether or not any errors were detected. In some embodiments, these results are saved to a file, while in the same or other embodiments they may be output via an I/O system such as one or more displays, speakers, etc. Combinations of the above are also possible and fully considered herein. Method 300 may then end 320.

In some embodiments, regardless of tracing method (i.e., whether instructions are "manually" marked for tracing, instructions are automatically traced for a given application, all instructions are traced, etc.), a memory translation debug system such as system 100 may compare results to expected values and/or output results, such as in 314 and 316 of FIG. 3. In embodiments where translations are not compared to expected values (i.e., where operations analogous to 314 of FIG. 3 are not performed), outputting results may simply include reporting the list of translations performed. This may include, for example, displaying a list of memory addresses.

Figure 4:
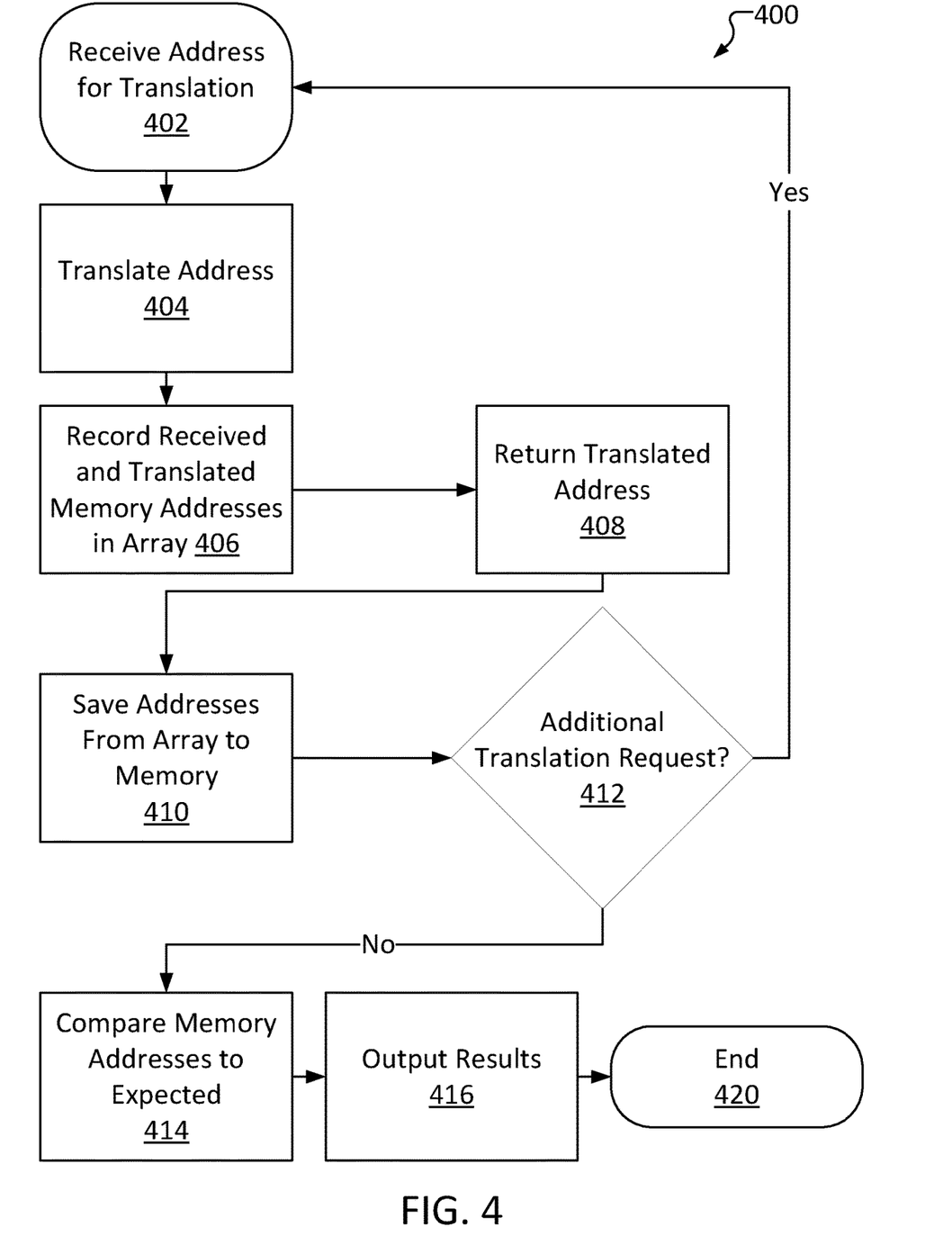
FIG. 4 illustrates a more detailed memory address translation tracing method according to an embodiment of the present disclosure.

FIG. 4 illustrates a more detailed memory address translation method 400 for a traced instruction according to an embodiment of the present disclosure. Method 400 may enable tracing memory translations via CPU, such as CPU 102 of FIG. 1. Method 400 includes receiving an address for translation 402. This may include, for example, a Memory Management Unit (MMU) of a CPU such as MMU 112 receiving a virtual address or a lower-level address as part of executing a traced instruction.

Method 400 further includes translating the address 404. This may include, for example, accessing data stored at an index of one or more page tables stored in physical memory (such as physical memory 142) to determine a next level address corresponding to the received address. The index of the page table may be based on the received address, and the data stored at that index may be the next level address. However, in some embodiments, multiple page tables may be used to represent a single layer of mappings, such as through the use of nested page tables. In these embodiments, the data stored at the index of a first page table may instead be utilized to determine a second index to be used with a second page table. The data stored at the second index of the second page table may be the next level address or may be used to determine a third index of a third page table, and so on. Translation 404 may also include accessing a translation lookaside buffer (TLB) to determine if the next level address is stored or cached there already, but as described above, in some embodiments TLB lookup may be disabled.

Method 400 further includes recording the received and translated addresses in an array 406. Method 400 further includes returning the translated address 408. This may include, for example, passing the translated address to the CPU (i.e., by transmitting an electrical signal via a CPU bus). Method 400 may further include saving the addresses from the array to memory 410.

In some embodiments, only a single translation may be needed for a particular instruction (e.g., virtual address to machine address). In such a case, operations 402-410 are performed once. If multiple translations are required (e.g., virtual address to intermediate address to machine address), then after operation 410, MMU 112 of CPU 102 may determine that an additional translation is needed 412. Method 400 may then return to receiving an address for translation 402, except the received address may be the previously returned translated address from the previous level. Thus, operations 402-410 are repeated for every level of translation for the instruction. Once all translations for the instruction are completed (412 "No"), physical memory 142 will include a list of translation steps performed for the instruction. For example, a list in memory 142 may include a virtual address and a first intermediate address, the first intermediate address and a second intermediate address, and the second intermediate address and a machine address.

In some embodiments, only one of the received and translated addresses may be recorded for every translation. For example, in some embodiments, operation 406 may simply include recording a received address in the array. As the received address of each level corresponds to the previous translated address, this may reduce redundancy and result in each address only being recorded once. The final machine address may be recorded to the array and saved to memory once no further translations are requested (i.e., between 412 "No" and 414). This may advantageously reduce required space in CPU memory 104, as only one address needs to be stored in the array at a time.

After no further translations are necessary (412 "No"), method 400 includes comparing the addresses recorded in memory 142 to expected values 414 and outputting results 416. These may be performed in ways substantially similar to operations 314 and 316, respectively, of FIG. 3. Method 400 ends at 420.

Figure 5:
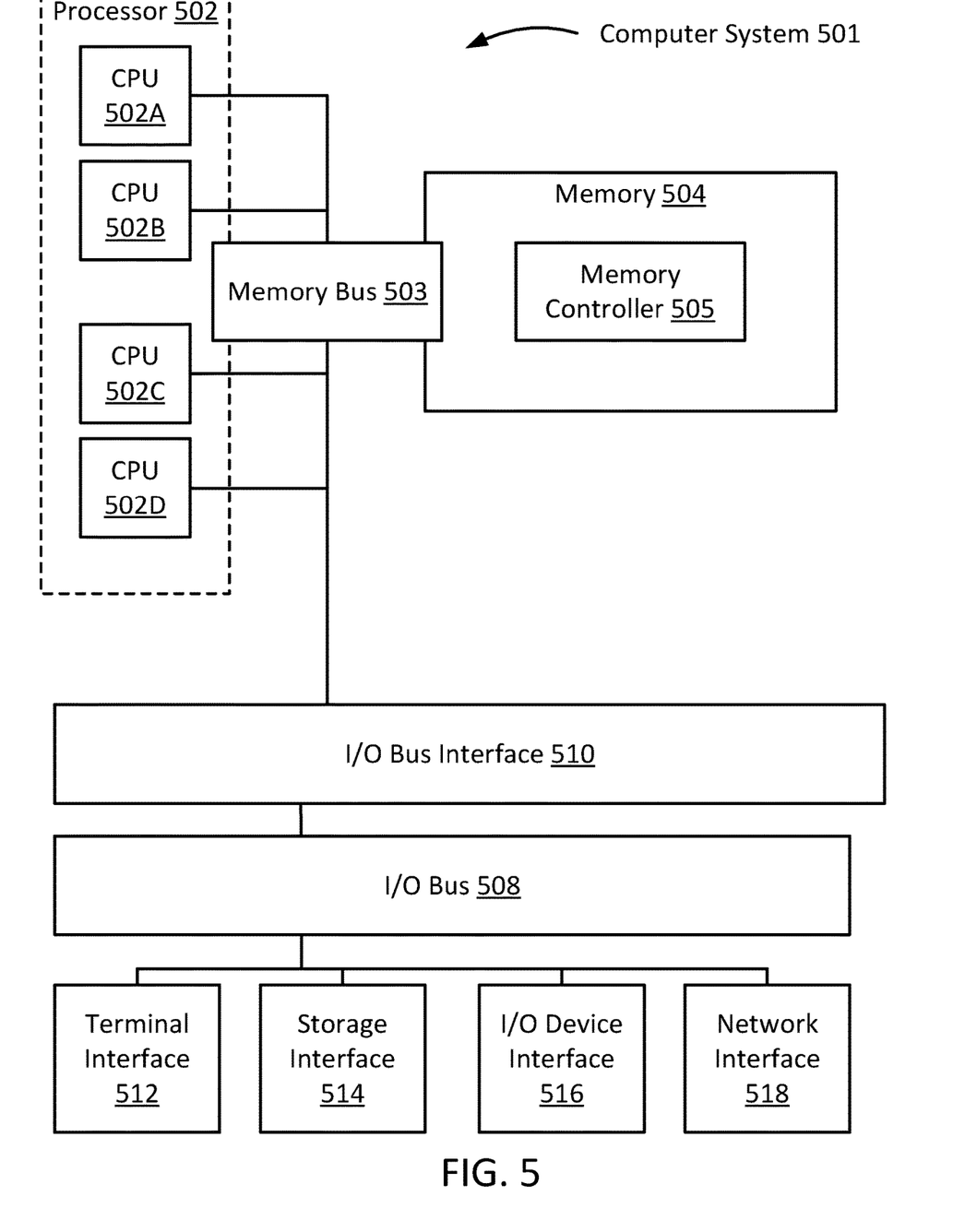
FIG. 5 illustrates a high-level block diagram of an example computer system that may be configured to perform various aspects of the present disclosure.

FIG. 5 illustrates a high-level block diagram of an example computer system 501 that may be configured to perform various aspects of the present disclosure, including, for example, methods 200, 300, and/or 400. The example computer system 501 may be used in implementing one or more of the methods or modules, and any related functions or operations, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 514, an I/O (Input/Output) device interface 516, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may comprise one or more levels of on-board cache.

In some embodiments, the memory subsystem 504 may comprise a random-access semiconductor memory, storage device, or storage medium (either volatile or non-volatile) for storing data and programs. In some embodiments, the memory subsystem 504 may represent the entire virtual memory of the computer system 501 and may also include the virtual memory of other computer systems coupled to the computer system 501 or connected via a network. The memory subsystem 504 may be conceptually a single monolithic entity, but, in some embodiments, the memory subsystem 504 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 504 may contain elements for control and flow of memory used by the CPU 502. This may include a memory controller 505.

Although the memory bus 503 is shown in FIG. 5 as a single bus structure providing a direct communication path among the CPUs 502, the memory subsystem 504, and the I/O bus interface 510, the memory bus 503 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface but receives requests from other computer systems (clients). Further, in some embodiments, the computer system 501 may be implemented as a desktop computer, portable computer, laptop or notebook computer, tablet computer, pocket computer, telephone, smart phone, mobile device, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
    determining that an instruction is marked for address tracing, wherein the instruction is stored at a first memory address;
    disabling, responsive to a determination that the instruction is marked for address tracing, cache lookup and translation lookaside buffer lookup for the instruction;
    executing, responsive to the determination, the instruction, wherein the executing includes translating a second memory address associated with the instruction from a first level address to a second level address; and
    recording, responsive to the determination, the first level address and the second level address.

2. The method of claim 1, wherein:
    the executing further includes translating the second level address to a third level address; and
    the method further comprises recording, responsive to the determination that the instruction is marked for address tracing, the third level address.

3. The method of claim 2, wherein:
    the third level address is a machine memory address;
    the second level address is a guest physical memory address; and
    the first level address is a guest virtual memory address.

4. The method of claim 1, further comprising:
    comparing the first level address to a first expected address; and
    comparing the second level address to a second expected address.

5. The method of claim 4, further comprising outputting a result of the comparisons.

6. The method of claim 1, further comprising triggering an interrupt after recording at least one of the first address and the second address.

7. The method of claim 1, further comprising writing the first level address and the second level address to a memory, wherein recording the first level address and the second level address comprises recording the first level address and the second level address in an array.

8. The method of claim 1, further comprising triggering an interrupt.

9. A system, comprising:
    a memory; and
    a processor coupled to the memory, the processor configured to:
        determine that an instruction is marked for address tracing, wherein the instruction is stored at a first memory address;
        disable, responsive to a determination that the instruction is marked for address tracing, cache lookup and translation lookaside buffer lookup for the instruction;
        execute, responsive to the determination, the instruction, wherein the executing includes translating a second memory address associated with the instruction from a first level address to a second level address; and
        record, responsive to the determination, the first level address and the second level address.

10. The system of claim 9, wherein:
    the executing further includes translating the second level address to a third level address; and
    the processor is further configured to record, responsive to the determination that the instruction is marked for address tracing, the third level address.

11. The system of claim 10, wherein:
    the third level address is a machine memory address;
    the second level address is a guest physical memory address; and
    the first level address is a guest virtual memory address.

12. The system of claim 9, wherein the processor is further configured to:
    compare the first level address to a first expected address; and
    compare the second level address to a second expected address.

13. The system of claim 9, wherein the processor is further configured to output a result of the comparisons.

14. The system of claim 9, wherein the processor is further configured to write the first level address and the second level address to the memory, wherein recording the first level address and the second level address comprises recording the first level address and the second level address in an array.

15. The system of claim 9, wherein the processor is further configured to trigger an interrupt.

16. A computer program product, the computer program product comprising a computer readable storage medium having program instructions embodied therewith, the program instructions executable by a computer to cause the computer to:
    determine that an instruction is marked for address tracing, wherein the instruction is stored at a first memory address;
    disable, responsive to a determination that the instruction is marked for address tracing, cache lookup and translation lookaside buffer lookup for the instruction;
    execute, responsive to the determination, the instruction, wherein the executing includes translating a second memory address associated with the instruction from a first level address to a second level address; and
    record, responsive to the determination, the first level address and the second level address.

17. The computer program product of claim 16, wherein the instructions further cause the computer to:
    compare the first level address to a first expected address; and
    compare the second level address to a second expected address.

18. The computer program product of claim 16, wherein the instructions further cause the computer to write the first level address and the second level address to a memory, wherein recording the first level address and the second level address comprises recording the first level address and the second level address in an array.

* * * * *